United States Patent [19]

Jacobi et al.

[11] 4,033,508
[45] July 5, 1977

[54] AUTOMATED IRRIGATION SYSTEM

[76] Inventors: Edgar F. Jacobi, 15962 Sunburst Lane, Huntington Beach, Calif. 92647; Mark R. Madden, Rte. No. 2, Plainfield, Wis. 54966

[22] Filed: May 13, 1976

[21] Appl. No.: 686,104

[52] U.S. Cl. .................................. 239/177; 137/344
[51] Int. Cl.² ........................................... B05B 3/12
[58] Field of Search .................. 239/177, 164, 165; 137/344

[56] References Cited

UNITED STATES PATENTS

| | | | |
|---|---|---|---|
| 3,802,627 | 4/1974 | Seckler | 137/344 X |
| 3,902,668 | 9/1975 | Daugherty et al. | 239/177 |
| 3,921,908 | 11/1975 | Zimmerer | 239/177 |

*Primary Examiner*—Evon C. Blunk
*Assistant Examiner*—Michael Mar
*Attorney, Agent, or Firm*—William C. Babcock

[57] ABSTRACT

In a center pivot irrigation system, comprising a hollow tube advanced on a wheeled carriage around a pivot and including a plurality of spray heads thereon, the improvement comprising a telescopically received extension deployable from the end of the pivoting tube at the corners of a rectangular plot. A stepping switch, fixed to the pivot, provides the requisite deployment signals at predetermined angular positions, releasing the extension and turning the wheels on a sliding support frame for advancement or retraction. The signals from the stepping switch are furthermore combined with a plurality of status signals to indicate a failure.

6 Claims, 12 Drawing Figures

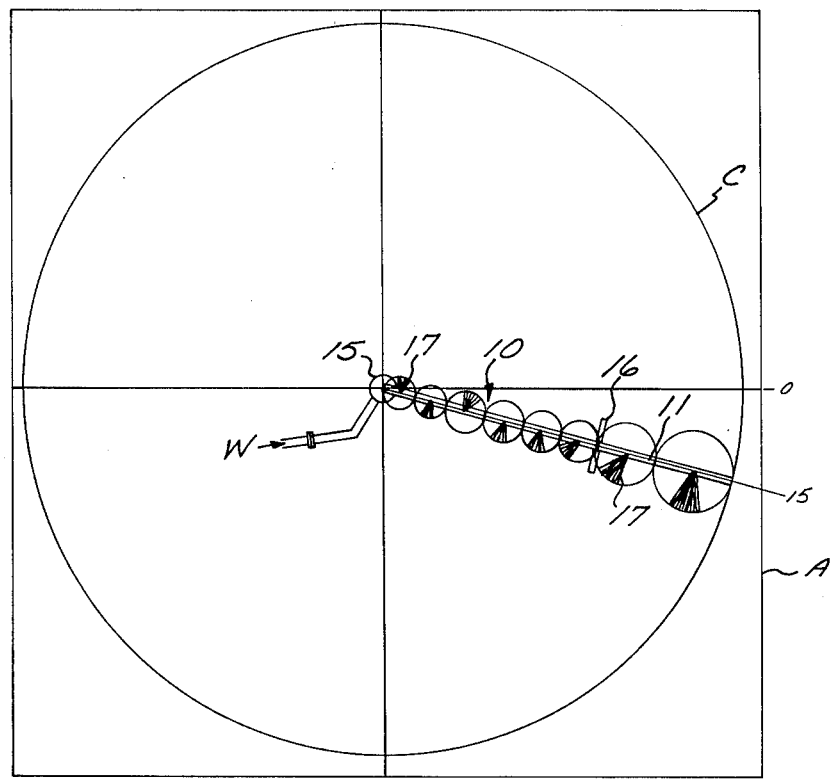
FIG. 1
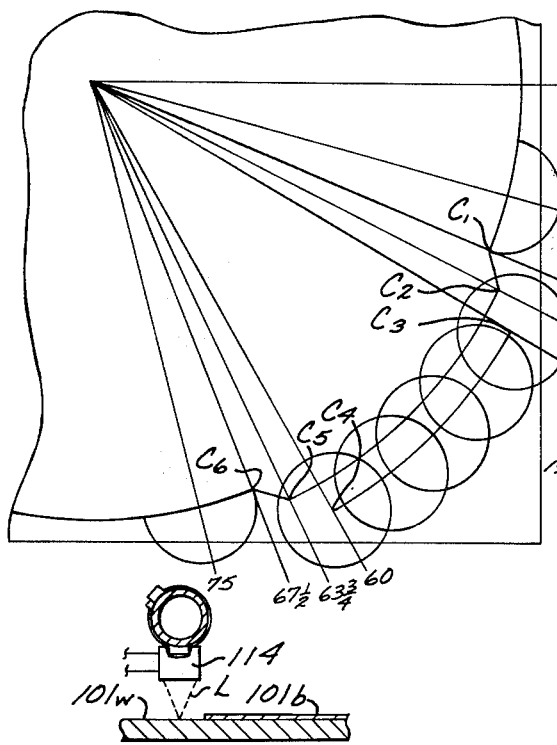
FIG. 2
FIG. 4
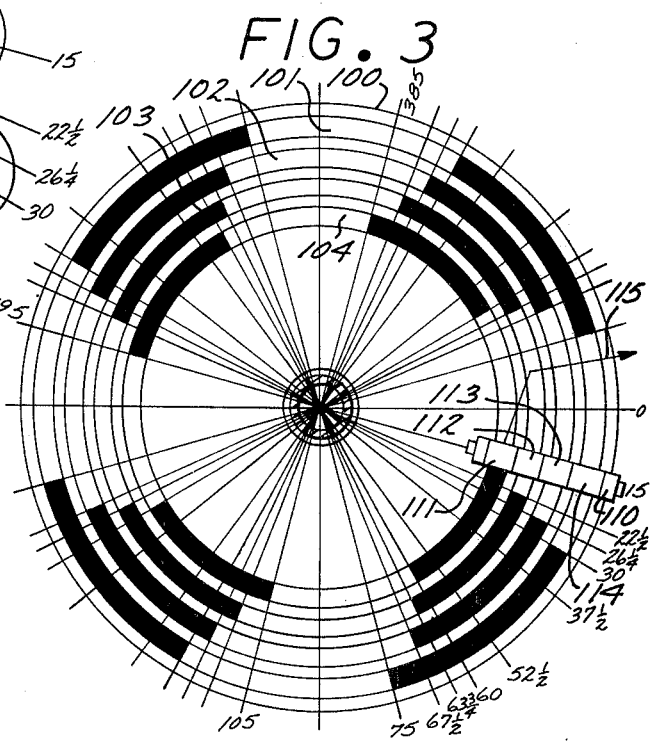
FIG. 3

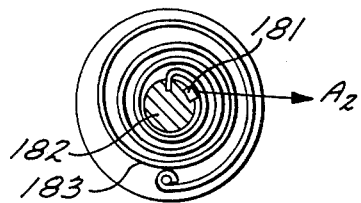
FIG. 10
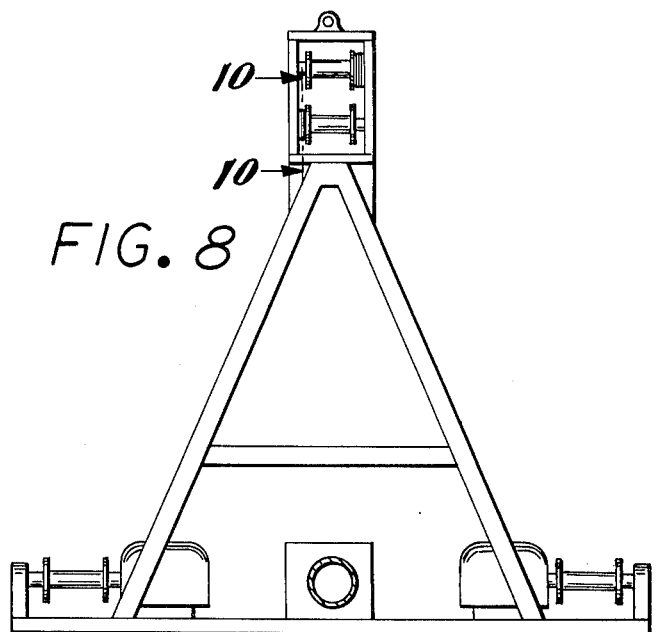
FIG. 8
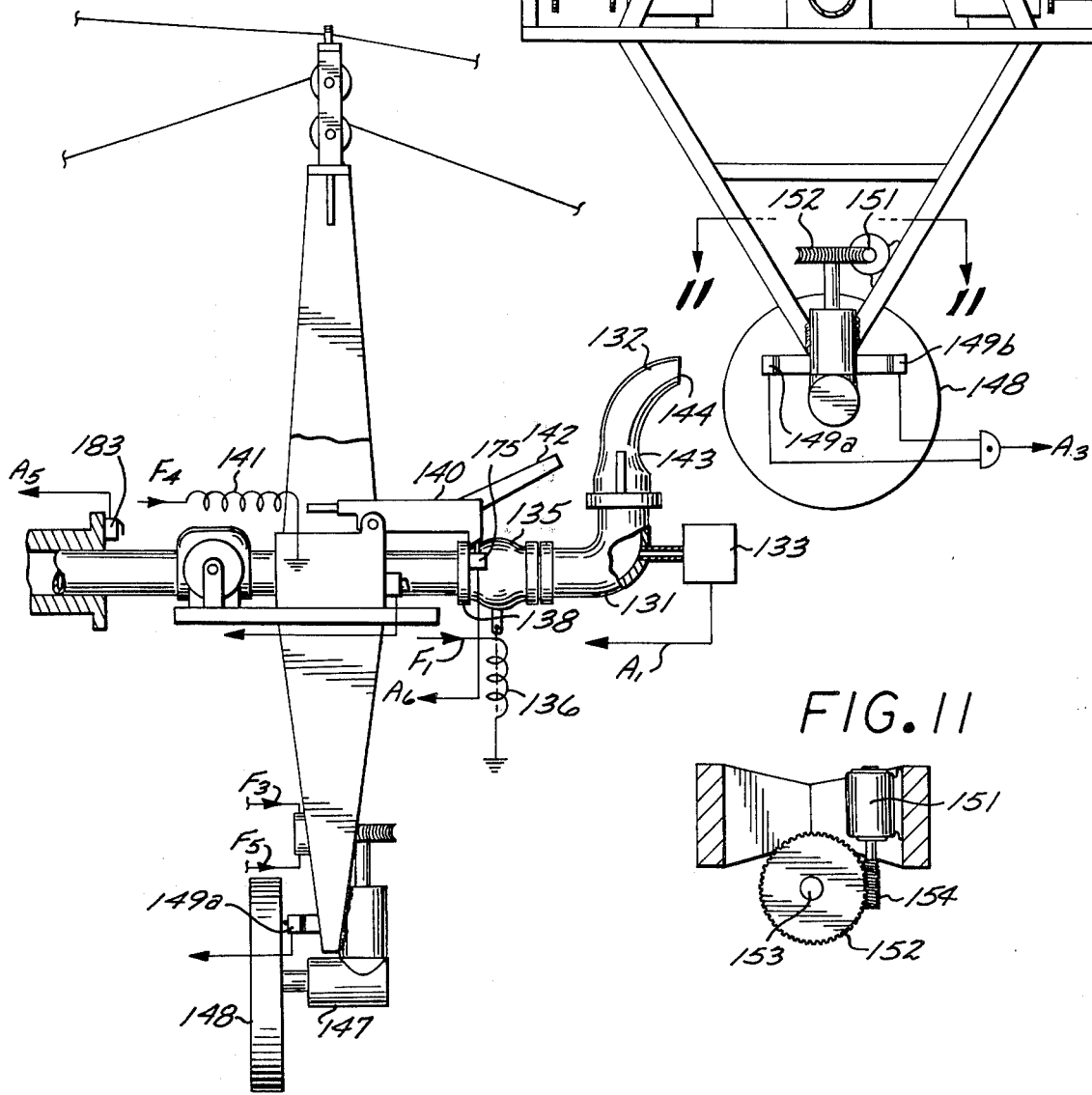
FIG. 9
FIG. 11

AUTOMATED IRRIGATION SYSTEM

BACKGROUND OF THE INVENTION

1. Field of the Invention

The present invention relates to commercial irrigation systems and more particularly to improvements in circular irrigators adapted for commercial use.

2. Description of the Prior Art

In commercial applications such as agricultural production controlled irrigation is of paramount importance. Typically, in order to conserve the cost of pipe and other equipment circular or center pivot irrigation systems have been utilized. In such center pivot systems, the water is applied to a tubular spray head assembly at the pivoted end and the other end is advanced in a circle on a wheeled undercarriage. By this arrangement, large agricultural plots can be sprayed with minimal investment in hardware.

Devices of this kind are typically limited to a circular pattern of a radius determined by the shortest dimension of the plot to be irrigated. Thus, for example, in a rectangular plot the center of the plot determines the pivot position and the shortest dimension determines the radius of the irrigation pipe. As result of such limitations, the corners of the plot are normally not irrigated.

When applied to a typical 160 acre plot, at least 30 acres distributed through the corners do not receive adequate irrigation. To at least partly solve this problem, techniques have been developed in which the irrigation pipe is provided with a manually operated end gun opened during the sections of arc when corner irrigation is desired. The use of an end gun, however, still entails only a limited increase in an area covered since both the pressure required is high and the proper timing of the on and off cycle requires constant monitoring.

SUMMARY OF THE INVENTION

Accordingly, it is the general purpose and object of the present invention to provide an automated control system for cyclically extending the length of the pivoted irrigation pipe to thus allow irrigation of the corners.

Further objects of the invention are to provide a telescopic arrangement in a pivotally articulated irrigation assembly which according to angular position will deploy irrigating spray heads at larger radial dimensions.

Yet, further objects of the invention are to provide an automated irrigation system wherein a substantially rectangular irrigation pattern is achieved.

Briefly, these and other objects are accomplished within the present invention by providing a telescopic extension on a conventional pivoted irrigation assembly, the deployment thereof being controlled by the arc position. More specifically, a conventional center pivot irrigation assembly comprises a length of tube pivotally fixed at one end and supported by a wheeled traveler on the other end. This configuration fixes any irrigation pattern to a circle and full coverage of large areas can only be achieved by overlap. Disposed along this tube are a plurality of spray heads, progressively larger in flow rate with radial position along the tube to provide an even coverage throughout the field of travel thereof. To minimize such overlap between adjacent assemblies of this kind, and the attendant waste of water, most often a certain amount of unirrigated or marginally irrigated coverage was accepted. It is specifically this problem that is now solved by way of the present invention.

In particular, the prior art pivotally articulated pipe is conformed to telescopically receive in the free end thereof a deployable extension. This deployable extension is supported by an articulated undercarriage which, by way of a stepping switch, can be controlled to assume various alignments away from tangent, and thus controls the deployment. Accordingly, concurrent with the pivotal motion of the irrigation pipe, command inputs are applied to this second traveler which by its alignment will then deploy the telescoping extension to reach into the corners.

BRIEF DESCRIPTION OF THE DRAWINGS

FIG. 1 is a plan view illustration of the irrigation coverage of a prior art device;

FIG. 2 is a plan illustration showing the increased coverage in one quadrant of FIG. 1 accomplished by the present invention;

FIG. 3 is a plan view of an optical stepping switch useful with the present invention;

FIG. 4 is a detailed illustration of one pickup useful with the switch shown in FIG. 3;

FIG. 8 is a detailed view of a wheel mounted traveler useful with the present invention;

FIG. 9 is a side view of the travelor shown in FIG. 8;

FIG. 10 is a sectional view taken along line 10—10 of FIG. 8;

FIG. 11 is yet another sectional view taken along line 11—11 of FIG. 8; and

DESCRIPTION OF THE SPECIFIC EMBODIMENT

Figure 5:
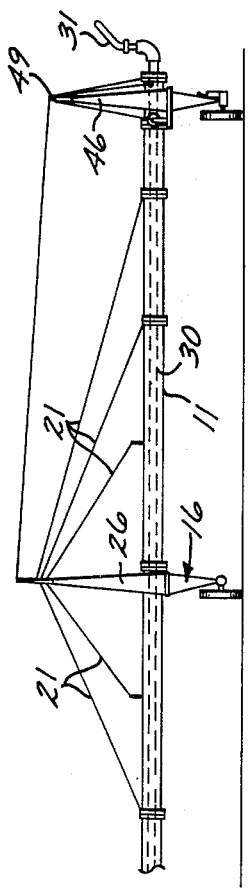
FIG. 5 is a side view illustration of a pivotal irrigation system incorporating the telescopic end section in its collapsed configuration.

While the following description sets forth a particular detailed illustration of a telescopically articulated end section, the selected details of implementation thereof are exemplary only. It is to be noted that those skilled in the art may find various structural alternative and no intent to limit the scope of the invention to this example is expressed.

As shown in FIG. 1, a conventional center pivot irrigation system, generally designated by the numeral 10, comprises a length of pipe 11 pivotally fixed to a pivot 15 at one end and supported by a wheeled undercarriage 16 proximate the other end. By way of this arrangement, pipe 11 can be articulated in a circle C dispensing water delivered from a source W through the pivot 15 and thence out through a plurality of rotary spray heads 17 on the pipe. In order to accommodate the variations in the linear velocity along the length of pipe 11, and thus to achieve an even coverage throughout the circle C, the rotary spray heads 17 are provided with varying orifices where the spray heads closest to the pivot 15 emits the lowest flow rate while the spray heads at the free end provide the highest rate.

As illustrated by way of a rectangular plat A, the circular pattern of irrigating coverage of this device does not cover the corners. The user then either elects overlapping coverage should he want the whole area irrigated or accepts less productive land use. Typically the cost scaling of these devices is such that one single assembly 10 will fit within plat A of approximately 160 acres. Lengths much smaller than that are normally not considered practical since a higher density of supply water outlets is required and at such density conventional stationary irrigation systems become more attractive. By virtue of the same cost considerations, usage of devices of this size in overlap adds significantly to the cost of irrigation and any technique which increases the coverage into the corners is therefore commercially attractive.

Figure 6:
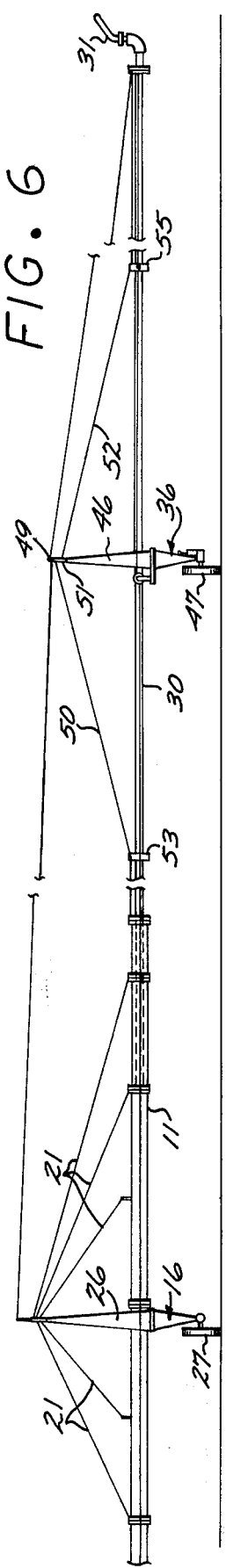
FIG. 6 is an extended illustration of the device shown in FIG. 5.

Accordingly, the present invention sets forth a telescoping extension adapted for use with this prior art device which according to the plan view in FIG. 2 will extend to irrigate further into the corners. As shown generally in FIGS. 5, 6, and 7 both weight and strength considerations dictate the use of a plurality of guy wires 21 extending from an apex on carriage 16 to support various points of pipe 11. More specifically, carriage 16 comprises a triangulated frame 26 attached in surrounding relationship around a central point on pipe 11 with the guy wires 21 extending from the vertical and horizontal end points thereof to support the pipe. This arrangement allows for the use of relatively thin walled tubular structure extending over substantial dimensions. The carriage frame 26, furthermore, is supported on a set of wheels 27 aligned in a tangential plane around the pivot 15. Wheels 27 may be driven by any conventional power source P at the desired rate in order to provide the requisite motive power for advancing the pipe.

Received within the interior of the free end of pipe 11 and adapted to telescopically extend therefrom is a tubular segment 30 which terminates on its free end in a rotary spray heat 31. Yet another carriage assembly 36 comprising a frame 46 supported on wheels 47 is disposed in sliding arrangement around the extendible pipe 30. A set of deployable guy wires similarly supports extension 30 when deployed. More specifically, assembly 36 includes at the apex thereof two spring-wound spools 49 and 51 from which corresponding cables 50 and 52 are played out, cable 50 passing through a sliding collar 53 to the free end of pipe 11 and cable 52 passing through a sliding collar 55 to the free end of the telescoping pipe section 30. As will be described in more detail below the wheeled undercarriage 47 is controllable in lateral articulation and can thus assume alignments away from the tangential plane to assist in the deployment of the extendible pipe 30.

Initially, or before deployment, the pipe section 30 is fully within the end of tube 11 with the sliding carriage 36 contained between the end sprinkler 31 and the adjacent end of the receiving tube. A solenoid articulated latch, to be described, retains the end sprinkler 31 relative the frame in this position. With this latching engagement, the end of extension 30 is thus secured to frame 46. Upon achieving the angular position where deployment is to be initiated, the undercarriage 47 is turned outwardly, withdrawing pipe 30 out of pipe 11 until cable 50 is fully played out. During this withdrawal alignment, the latching engagement between the end sprinkler 31 and frame 46 is maintained. Once cable 50 is played out either a concurrent or a subsequent signal unlatches the end of the pipe 30 which is then extended outwardly by the internal water pressure. Again, the limits of the outward progression during this part of the cycle are controlled by the played out length of cable 52.

The latching mechanism, according to the following description, can also be utilized to limit the pivotal motion of the end sprinkler 31 to thus preclude any unnecessary overlap during the semideployed stages of operation.

Figure 7:
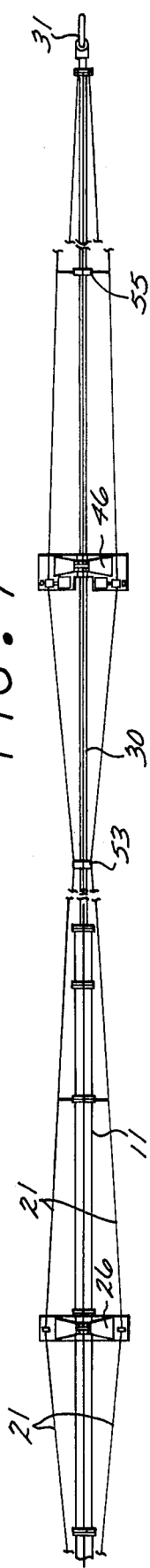
FIG. 7 is a top view of the illustration shown in FIG. 6.

At the completion of the extended segment of travel section 30 is retracted towards carriage 36 by way of two powered spools 61 and 62 shown in FIG. 7. These spools both play out and take in two lateral support cables 63 and 64 extending between carriage 36 and the end of the extension. These last two cables furthermore provide lateral stiffness to the deployed pipe section 30 and fix the angular relationship of frame 46 relative the section.

By reference back to FIG. 2, this generally described arrangement of parts will maintain the articulation of the end sprinkler 31 in a semicircular pattern until a point C-1 on the periphery of the circle C. At point C-1 a signal is applied to rotate the wheel assembly 47 which begins the withdrawal sequence of the pipe section 30 out of pipe 11. This withdrawal is continued, with the sprinkler 31 still limited to a semicircular pattern, until a point C-2 is reached. This point C-2 is determined by the play out length of cable 50. At this point, either a microswitch signal tied to the spool 49 indicating its play out or an angular position can be utilized to unlatch the end sprinkler 31 from frame 46, permitting further deployment of pipe 30 and concurrently a full circular pattern. Again, full deployment is achieved at some point subsequent, shown herein as point C-3, the radial dimension of that point being determined by the play out length of cable 52. The whole assembly is then free to advance in rotation through the corner area of the plat A until a point C-4 is reached at which withdrawal by take up on spools 61 and 62 is initiated. The withdrawal sequence is thus similar to the deployment sequence, going through steps C-5 and C-6 from a full circle to a semicircle spray pattern out of the end spray head 31.

With this general description, the various detailed elements combined in the system are now described. More specifically, as shown in FIG. 3, the angular position of pipe 11 with respect to some imaginary reference axis X is provided by an optical sequencing or stepping switch comprising a disc 100 fixed to pivot 15. Disc 100 includes four concentric optical tracks 101-105 on one surface thereof. Each track of the disc 101-105 includes white segments 101 W and black segments 101 B which are picked up by a photodetector assembly 110 having a corresponding set of four optical apertures 111-114. Detector 110 is fixed to the pipe 11 and thus rotates along with the pipe relative the pivot 15. Each photodetector stage 111-114 thus provides a corresponding signal 111 S - 114 S which is utilized in an electrical circuit to be described. As shown in FIG. 4, each detector stage 111-114 comprises a conventional phototransistor/light emitting diode coupling device which through the reflectivity of the underlying track develops either a logical one or a logical zero signal. Specifically, as shown in this figure a photodetector stage as that utilized in section 114, for example, emits a beam of light L which in the white section 101 W is reflected at almost equal intensity to the phototransistor. During the alignment of the black segment 101 B, for example, the reflection path of the beam L is substantially weaker. This is conventionally interpreted into the above-mentioned logical high and low signal for further use herein.

These signals together with a combination of a plurality of other limit signals are combined in a logical manner in the circuit shown in FIG. 12, which according to the description set forth hereinbelow, controls the irrigation sequence. By specific reference to FIG. 9, the end sprinkler 31 comprises an elbow 131 attached to the free end of section 30 and supporting in the other opening a rotary spray head 132. A flow gauge 133 is connected to sense the flow rate through elbow 131 and produces a binary signal $A_1$ indicative of the gross flow or no flow condition thereat. This signal verifies the operation of a shut-off valve 135, line mounted on extension 30 immediately ahead of the end sprinkler 31. Line valve 135 furthermore includes a conventional solenoid 136 which opens the valve in response to yet another binary signal $F_1$.

In order to provide the above-mentioned retaining engagement of extension 30 relative to the carriage 36 valve 135 is furthermore provided with an enlarged peripheral lip 138 aligned for engagement by a latch 140 which in turn is articulated by a solenoid 141 controlled by yet another binary signal $F_4$. It is this last device that maintains the extension 30 in a fixed relationship relative to frame 46 during the intitial maneuver of the undercarriage 47.

By reference to FIGS. 8, 9, and 11, the undercarriage 47 is articulated by a steering motor 151 mounted in the lower end of frame 46; motor 152 engaging through a worm gear 154 a turning gear 152 which controls the steering alignment of a wheel 148. In addition to this articulation mechanism, there is further included in the undercarriage 47 a drive motor 147 which provides the driving power to the wheel.

The direction of rotation of motor 151 and, therefore, the direction of steering control is provided by two signals $F_3$ and $F_5$ which are turned on at various increments of arc according to the description following. Furthermore, to simplify the control sequence, motor 151 is configured as a stepping motor, going to fixed steering angles in response to the $F_3$ and $F_5$ signals. Thus, signals $F_3$ and $F_5$ initiate the turning control which is then essentially open loop.

While the foregoing description of the turning mechanism does implement the turning requirements, it is to be understood that various other techniques known in the art can be utilized herein. Thus, for example, a conventional latching technique may be utilized to maintain the power on to motor 151 until a 45 degree turn is achieved in the undercarriage. It is to be understood that signals $F_3$ and $F_5$ entail bidirectional mode of operation for the motor and therefore the necessary phase reversals are subsumed in this description.

A similar set of signals $F_6$ and $F_7$ are applied to the previously described powered take-up spools 61 and 62 during the retraction sequence of the pipe. Thus, the input signals $F_1 - F_7$ provide the requisite command necessary to carry any extension sequence generally described above.

The implementation of the semicircular to circular pattern transition described above is similarly achieved. For the purposes herein, a transition at point C-2 in the FIG. 2 diagram switching from a semicircular spray pattern to a full circle pattern is considered sufficient and for that reason a simple mechanical arrangement is shown whereby nozzle 132 will be limited to a semicircular pattern as long as latch 140 is engaged. This implementation is achieved by two lateral pads 143 and 144 extending radially from the sides of the rotary nozzle 132, pads 143 and 144 being aligned to abut a longitudinal projection 142 extending from the free end of latch 140. The semicircular spray pattern is therefore fixed during those times when a latching engagement of the free end of extension 30 is maintained. Once the extension is unlatched, and the nozzle 132 separates sufficiently from projection 142, the nozzle is free to turn in a full circle.

Figure 12:
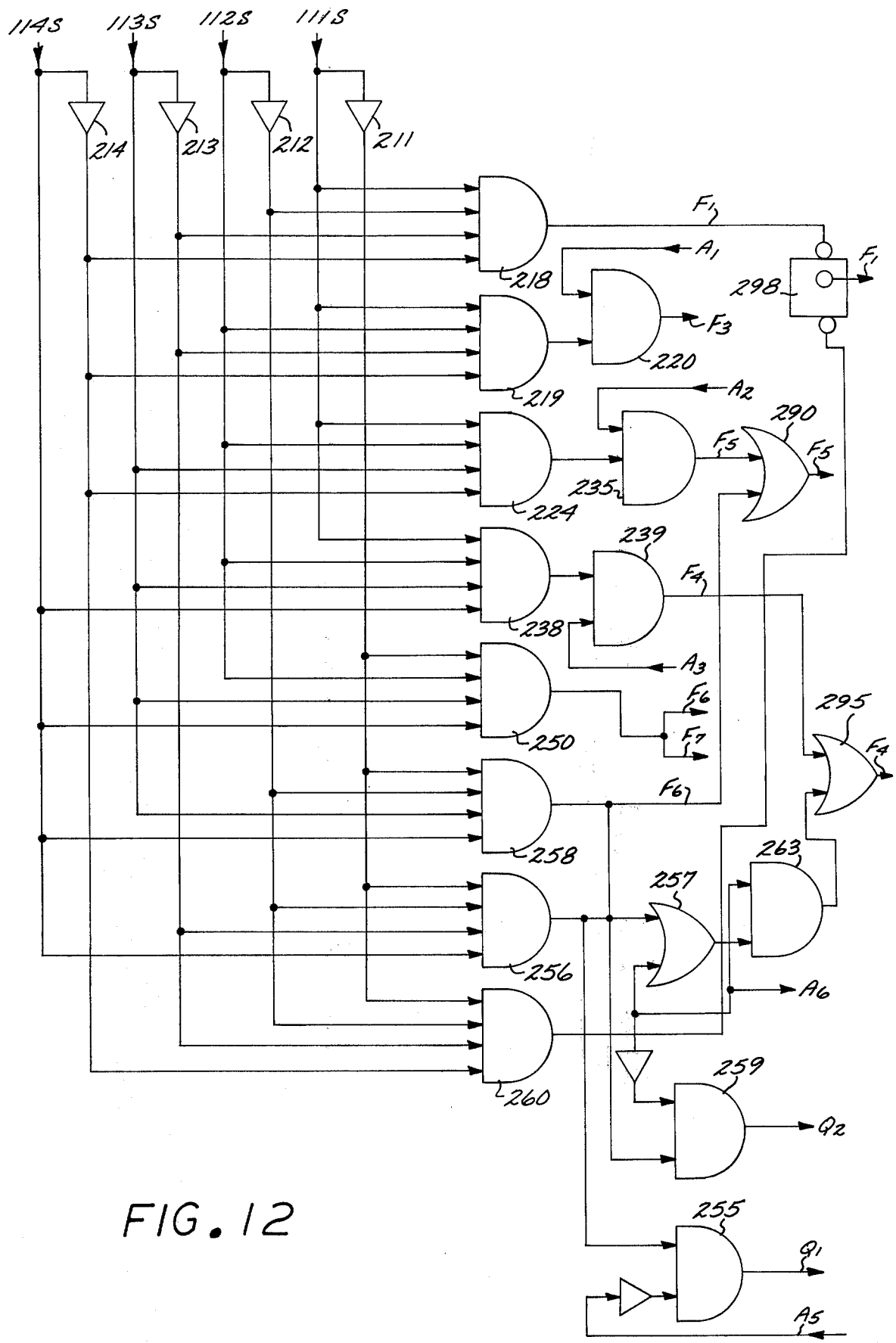
FIG. 12 is a logic diagram useful with the present invention.

The combination of the above signals $F_1$–$F_7$ is generated according to a logical sequence set in the circuit shown in FIG. 12 and the stepping sequence of signals 111 S – 114 S. Specifically, as shown in FIG. 12, signal 111 S is applied in parallel to four AND gates 218, 219, 224, and 238. Concurrently, that same signal is inverted by an inverter 211 and applied to yet another four AND gates 250, 253, 256, and 260. Signal 112 S, similarly inverted through an inverter 212, is collected at gates 218, 253, 256, and 260. The noninverted or the direct signal 112 S is in turn collected at gates 219, 224, 238, and 250.

In a similar manner, both the signals 114 S and 113 S are inverted by corresponding inverters 214 and 213, the output of inverter 213 being collected again at gates 218, 219, 256, and 260 and the output of inverter 214 being collected at gates 218, 219, 224, and 260. In addition, these same signals, i.e., signals 113 S and 114 S are respectively applied to gates 224, 238, 250, and 253 and to gates 238, 250, 253, and 256.

Gate 218 provides the above described signal $F_1$, at point C-1 in FIG. 2, to open valve 135 and therefore initiate the semicircular spray pattern out of nozzle 132. The output of gate 219, on the other hand, is collected with the above described signal $A_1$ (from flow meter 133) at yet another AND gate 220 to produce the above described signal $F_3$. This initiates the turning cycle of motor 151 to rotate the undercarriage 148 away from tangent and therefore to initiate the withdrawal sequence.

As shown in FIG. 10, yet another signal $A_2$ is developed by a microswitch 181 placed within the spring assembly of spool 49 and particularly between a center shaft 182 and a spiral spring 183 coiled thereabout. Thus, as the spring is completely uncoiled the microswitch 181 is permitted to articulate. In this configuration, a normally closed push-to-open microswitch can be utilized and therefore a circuit closure will occur upon the complete playout of cable 50. This signal $A_2$ indicates the end of travel of the carriage 36 and thus provides the input for generating signal $F_5$ returning the wheel 148 to the neutral position.

To correlate this signal with the events on the disc 100, signal $A_2$ is brought back to an AND gate 235 which concurrently collects the output of an AND gate 224. It is this AND gate 235 that provides the $F_5$ signal. In a similar manner, gate 238 provides yet another output which is collected at an AND gate 239 with a signal $A_3$ from microswitches 149 A and 149 B indicating a neutral position of wheel 148; the output of gate 239, providing the above described signal $F_4$ to the solenoid winding 141 which pulls in the latch 140. Once this pull-in stroke is achieved, the extension 30 is free to progress outwardly driven by its internal pressure to extend both out of pipe 11 and through the center of carriage 36 to its limits as set by the length of cable 52. The sprinkler system then progresses in this configuration along the arc of segment 101 B. Once the sensor array 110 progresses beyond the edge of setment 104 B, gate 250 goes high providing the two signals $F_6$ and $F_7$ to the windup spool 61 and 62 to begin retraction of the pipe. On the next termination of the black increment, i.e., at the end of segment 103 B, gate 253 goes high providing an alternate input to the steering motors 151 equal in polarity and turning direction to the signal $F_5$. For this reason, the output of gate 253 is combined at an OR gate 290 with the output of gate 235 and it is the output of gate 290 that is therefore more properly identified as the source of signal $F_5$.

On advancement beyond the segment 112 B, gate 256 is turned on. The output of gate 256 is similarly collected at the input of an OR gate 257 with yet another safety signal $A_6$ originating from a microswitch 175 interposed between the end of latch 140 and the projection 138. It is the closure of this microswitch that indicates a full latching engagement of the extension 30 relative frame 46. The output of gate 257 is then combined once more with the signal $A_6$ in yet another AND gate 263 which provides the return signal $F_3$ to drive the wheel 148 back to neutral. Again, an OR gate 295 is utilized for this purpose, collecting the two origins of this signal.

Gate 260 indicates the complete transition through a corner sequence and therefore provides the closing signal to valve 135. In order to latch at either an open and closed input to the valve 135, the output of gates 260 and 218 are applied respective to the set and the reset terminals of the flip-flop 298 which at its Q output provides the actual signal $F_1$ to the operating solenoid 136.

In addition to the above features, there is a fail-safe logic circuit comprising two AND gates 259 and 255, gate 259 collecting the inverted signal $A_6$ with the output of gate 253 and gate 255 collecting the output of gate 256 with an inverted signal $A_5$ originating at a microswitch 183 disposed between the end of pipe 11 and the structure of frame 46. Thus, two safety conditions are identified: The first, identified by gate 255, sets the condition that the carriage 36 is not properly in place against the end of pipe 11 at an angular position when such should have occurred. The second, identified by gate 259, set at an earlier position, requires the full retraction of the extension 30 by the motor driven spools 61 and 62. In either case, the output signal from gate 259 or 255 will operate to terminate all power to the system thus precluding the condition in which the pipe is in its extended form at a point where interfering projection can occur into the boundries of a roadway, for example, adjacent to the plot A.

It is to be noted that this sequence of operation is sized for a particular range of the end spray pattern relative to the size of the field. Other configurations are possible, as for example configurations deploying more than one spray head on extension 30. Furthermore, with a proper selection of spray heads and timing program various field configurations other than a square can be accommodated. In addition, the disc 100 can accommodate variants in the extension sequence whenever stationary objects are to be avoided.

Obviously many modifications and variations to the above disclosure can be made without departing from the spirit of the invention. It is therefore intended that the scope of the invention be determined solely dependent on the claims hereto.

We claim:
1. In a center pivot irrigation system having a tubular water dispensing assembly pivotally mounted on one end and supported on a first powered carriage proximate the other end for advancing in a circular pattern, the improvement comprising:
a deployable extension adapted for telescopic receipt within said other end of said dispensing assembly;
spray dispensing means mounted on said extension;
a second powered carriage connected to slidably support said extension including steering means for controlling the alignment thereof relative said first carriage;
limiting means connected between said other end of said dispensing assembly and said second carriage for limiting the separation distance therebetween;
latching means mounted on said second carriage for selectively retaining the free end of said extension adjacent said second carriage; and
sequencing means operatively connected between said pivot and said dispensing assembly for producing a plurality of control signals in a sequence associated with the angular positions of said assembly, selected ones of said control signals being connected to control respective ones of said second carriage means and said latching means.

2. Apparatus according to claim 1 further comprising:
sensing means disposed between said second carriage and said assembly, said extension and said second carriage and in said limiting means for producing a plurality of indicating signals respectively indicative of the proximity of said second carriage relative said other end of said assembly and said free end of said extension and of the limit proximity of said limiting means.

3. Apparatus according to claim 2 wherein said sequencing means further comprises:
a rotary sequencing switch having a plurality of binary signal outputs each producing selected parts of a binary signal in association with the angular position of said assembly; and
logic means connected to receive said binary signal outputs, and said indicating signals for producing said control signals at predetermined combination thereof.

4. Apparatus according to claim 3 wherein:
said sequencing switch comprises a circular disc fixed to said pivot and having formed on one face thereof a plurality of concentric tracks, each track comprising arcuate segment of low and high reflectivity, and a photodetector array fixed to said assembly and aligned to overlie said tracks for producing said binary signal outputs according to the underlying segments of said tracks.

5. Apparatus according to claim 1 wherein:
said spray dispensing means includes a rotary spray head disposed on the free end of said extension and said latching means includes a projection for limiting the rotary articulation of said spray head.

6. Apparatus according to claim 5 further comprising:
a control valve mounted proximate the free end of said extension and rendered operative by a selected one of said control signals.

* * * * *